United States Patent
Madden et al.

(10) Patent No.: US 6,393,493 B1
(45) Date of Patent: May 21, 2002

(54) SYSTEM AND METHOD FOR OPTIMIZING SERIAL USB DEVICE READS USING VIRTUAL FIFO TECHNIQUES

(75) Inventors: David Madden, Austin; Mike Steed, Round Rock; Irwan Djajadi, Austin, all of TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/062,893

(22) Filed: Apr. 20, 1998

(51) Int. Cl.[7] .................................................. G06F 9/54
(52) U.S. Cl. ........................................ 709/321; 710/23
(58) Field of Search ................... 709/321.327, 100–108, 709/321, 322; 710/52, 22, 23, 260; 711/138

(56) References Cited

U.S. PATENT DOCUMENTS

| | | | | |
|---|---|---|---|---|
| 4,916,608 A | * | 4/1990 | Shultz | 709/104 |
| 5,247,639 A | * | 9/1993 | Yamahata | 711/138 |
| 5,923,852 A | * | 7/1999 | Lee et al. | 709/234 |
| 5,926,775 A | * | 7/1999 | Brumley et al. | 702/127 |
| 5,987,530 A | | 11/1999 | Thomson | |
| 6,052,743 A | * | 4/2000 | Schwan et al. | 710/23 |
| 6,073,205 A | | 6/2000 | Thomson | |
| 6,098,124 A | * | 8/2000 | Odom | 710/52 |
| 6,179,489 B1 | * | 1/2001 | So et al. | 709/102 |

OTHER PUBLICATIONS

National Instruments Instrumentation Reference and Catalogue 1997, Test and Measurement Industrial Automation, pp 3–23 thru 3–27.

* cited by examiner

*Primary Examiner*—St. John Courtenay, III
*Assistant Examiner*—Van H. Nguyen
(74) *Attorney, Agent, or Firm*—Conley, Rose & Tayon PC; Jeffrey C. Hood

(57) ABSTRACT

A USB-based data acquisition system including virtual buffer software which increases USB data transfer rates with minimal changes to DAQ driver level software. The virtual buffer software operates to receive or intercept calls made by the DAQ driver level software to acquire data from the device, wherein the DAQ driver level software is designed to read the data from the device one sample at a time from the device. The virtual buffer software intercepts the call and requests the data in bulk packets from the device. The virtual buffer software then stores the received packets of data in a virtual buffer or virtual FIFO maintained in computer system memory. The DAQ driver level software then obtains the data from the computer system memory using much faster transfers. The virtual buffer software emulates operation of the device, including generation of interrupts and responses to status register reads, thus "fooling" the DAQ driver level software into thinking the data is being acquired from the device. Thus, the present invention allows for much faster data transfers, while requiring minimal or no changes to the existing DAQ driver level software.

19 Claims, 6 Drawing Sheets

SYSTEM AND METHOD FOR OPTIMIZING SERIAL USB DEVICE READS USING VIRTUAL FIFO TECHNIQUES

FIELD OF THE INVENTION

The present invention relates to USB data acquisition (DAQ) systems, and particularly to a virtual FIFO implementation which emulates a hardware device for improved USB data acquisition performance.

DESCRIPTION OF THE RELATED ART

Scientists and engineers often use DAQ systems to perform a variety of functions, including laboratory research, process monitoring and control, data logging, analytical chemistry, test and analysis of physical phenomena, and control of mechanical or electrical machinery, to name a few examples.

A typical DAQ system comprises a computer system with DAQ hardware, wherein the DAQ hardware is typically plugged into one of the I/O slots of the computer system. A DAQ system also typically includes transducers and other detecting means for providing "field" electrical signals representing a process, physical phenomena, equipment being monitored or measured, etc. The field signals are provided to the DAQ hardware. In another common DAQ system configuration, the DAQ hardware is coupled to the computer system via other means such as through a VXI (VME extensions for Instrumentation) bus, a GPIB (General Purpose Interface Bus), a serial port, or parallel port of the computer system. Optionally, the DAQ system includes signal conditioning modules which receive the field signals and condition the signals to be acquired.

The DAQ hardware is configured and controlled by DAQ software executing on the computer system. The DAQ software for configuring and controlling the DAQ system typically comprises two portions: the device interface or driver level software and the application software, or the application. The driver level software serves to interface the DAQ hardware to the application. The driver level software is typically supplied by the manufacturer of the DAQ hardware or by some other third party software vendor. An example of DAQ driver level software is NI-DAQ from National Instruments Corporation. The application or client is typically developed by the user of the DAQ system and is tailored to the particular function which the user intends the DAQ system to perform. The DAQ hardware manufacturer or third party software vendor sometimes supplies the application software for certain applications which are common, generic or straightforward.

The Universal Serial Bus is a serial peripheral bus standard developed for computer system peripheral devices. The USB is an external serial bus which supports data exchange between a host computer and a wide range of peripheral devices. The USB provides two wire, point-to-point signaling in which the signals are differentially driven at a bit rate of 12 megabits per second.

USB systems are generally defined in terms of (1) interconnects, (2) devices, and (3) hosts. The USB interconnect defines the manner in which the USB devices are connected to and communicate with the USB host. The host computer system USB interface is referred to as the host controller. The host controller may be implemented in a combination of hardware, firmware, or software. USB devices are defined as (1) hubs, which provide additional attachment points to the USB, or (2) functions, which provide capabilities to the system; e.g., an ISDN connection, a digital joystick, or speakers. Hubs indicate the attachment or removal of a USB device in its per port status bit. The host determines if a newly attached USB device is a hub or a function and assigns a unique USB address to the USB device. All USB devices are accessed by a unique USB address. Each device additionally supports one or more endpoints with which the host may communicate. The remaining description will be limited to USB devices defined as functions.

The USB supports functional data and control exchange between the USB host and USB devices. USB data transfers take place between host software and a particular endpoint on a USB device. The USB host, e.g., the host computer system, interacts with USB devices through the host controller. The host controller is responsible for detecting the attachment and removal of USB devices, managing control flow between the host and USB devices, managing data flow between the host and USB devices, collecting status and activity statistics, and providing a limited amount of power to attached USB devices. The USB system software on the host manages interactions between the USB devices and device software. Further background concerning the USB may be obtained from USB Specification, Revision 1.0 which is incorporated herein by reference.

In prior art systems, e.g., prior art instrumentation systems, the host CPU obtains data from a peripheral device, such as a data acquisition card, using either DMA transfers or interrupt driven requests. DMA transfers typically use burst transfers for improved performance. However, for interrupt driven requests, the host software is typically required to read one sample at a time. In other words, for interrupt drive requests, host software is typically configured to read data one sample at a time from a local peripheral device, e.g., from a PCI DAQ device.

DMA transfers are generally not possible for USB transfers between a host computer system and a USB device. Thus, for USB transfers, the host controller typically utilizes existing driver level software which operates to read or communicate data with the USB device one sample at a time. Thus, when this existing driver level software is used, the host controller is required to read data from a USB DAQ device one sample at a time.

However, due to the relatively slow transfer rates of the USB, a read of one sample at a time results in slow data transfer rates. For example, the time required to read 100,000 samples from the USB device would be no faster than 100,000 samples times 0.003 seconds/sample which equals 300 seconds, i.e., 333 samples per second. Thus, simple data acquisition tasks using a USB DAQ device take a very large amount of time. Alternatively, the existing driver level software can be modified to take advantage of USB packet transfers. However, this may require a large modification to existing software, which is undesirable.

Therefore, an improved system and method is desired which provides increased performance for USB devices. It is also desirable to improve the performance of USB devices with minimal impact on existing software and drivers.

SUMMARY OF THE INVENTION

The present invention comprises a system and method for performing data transfers in a data acquisition system comprising a computer system and a device coupled to the computer system through a serial bus. The serial bus is preferably the Universal Serial Bus (USB), and the device is preferably a USB DAQ device. The computer system includes device driver software, preferably DAQ driver level software, and serial bus driver software, preferably USB software. The computer system also includes virtual buffer software according to the present invention.

The virtual buffer software increases USB data transfer rates in the USB-based data acquisition system with minimal changes to DAQ driver level software. The virtual buffer software operates to receive or intercept calls made by the DAQ driver level software to acquire data from the device, wherein the DAQ driver level software is designed to read the data from the device one sample at a time from the device. The virtual buffer software intercepts the call and requests the data in bulk packets from the device.

The virtual buffer software then stores the received packets of data in a virtual buffer or virtual FIFO maintained in computer system memory. When a determined amount of data is stored in the virtual FIFO, the virtual buffer software generates an interrupt to the device driver software.

In response to the interrupt, a device driver software interrupt service routine executes to read a status register to determine a cause of the interrupt. The virtual buffer software intercepts the status register read operation and returns a status of the buffer portion of the computer memory which stores the data, wherein the status of the buffer portion of the computer memory reflects the data received from the device. The device driver software interrupt service routine then reads the data a sample at a time from the virtual FIFO in response to the interrupt and in response to the status of the buffer portion of the computer memory reflecting the data received from the device.

The DAQ driver level software thus obtains the data from the computer system memory using much faster transfers, e.g., up to 100,000 samples per second. The virtual buffer software emulates operation of the device, including generation of interrupts and responses to status register reads, thus "fooling" the DAQ driver level software into thinking the data is being acquired from the device. Thus, the present invention allows for much faster data transfers, while requiring minimal or no changes to the existing DAQ driver level software.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
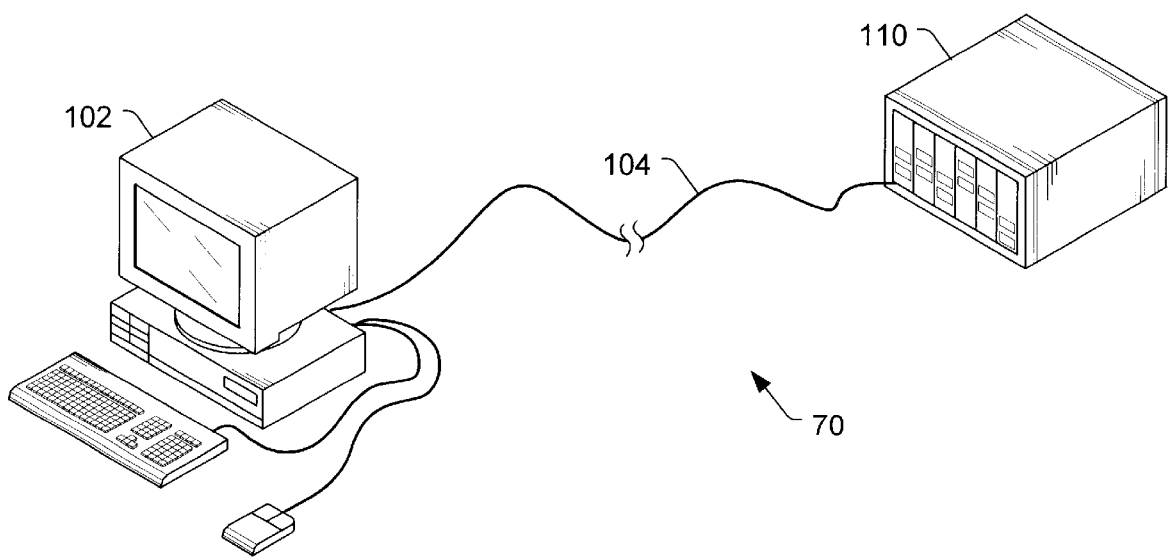
FIG. 1 illustrates a computer system including a USB-based DAQ device.

FIG. 1—USB DAQ System

FIG. 1 illustrates a USB-based I/O system 70 according to one embodiment of the present invention. In the preferred embodiment, the I/O system is a data acquisition (DAQ) system. As shown, the DAQ system 70 includes a computer 102. The computer 102 preferably includes various standard components, including at least one central processing unit (CPU), non-volatile memory such as a hard drive, system memory, one or more buses, and a power supply.

A USB I/O device 110, preferably a data acquisition (DAQ) device, is coupled through a universal serial bus (USB) cable 104 to the computer system 102. The USB DAQ device 110 interfaces to a unit under test (UUT) or process for which data acquisition/generation is desired. In the preferred embodiment, the USB DAQ system includes transducers or other detecting means (not shown) which provide field electrical signals to the USB DAQ device 110, optionally through signal conditioning circuitry (not shown).

Examples of USB DAQ device 110 are the following products available from National Instruments Corporation: DAQPad-6020E for USB, DAQPad-6507, and DAQPad-6508.

As noted above, in the preferred embodiment the USB device 110 is a DAQ device. However, the USB device 110 may be any of various devices or peripherals, including a keyboard, mouse, speakers, sound card, video card, graphics card, digital video input/output device, printer, or other types of I/O devices.

The preferred embodiment of the present invention utilizes a USB serial bus and a USB device. However, it is noted that the present invention may use any of various types of serial buses, as desired. Also, the computer 102 may comprise any of various types of computers or systems, as desired, including a general purpose computer, a VXI chassis including one or more VXI boards, a PXI (PCI extensions for instrumentation) chassis, as well as others. FIG. 1 shows host computer 102 connected, via USB bus 104, to a single USB device 110. However, the invention should not be limited thereto it being understood that the present invention has application to host computer 102 connected to several USB devices 110 via USB 104.

The computer 102 preferably includes a memory media on which computer programs according to the present invention are stored. The software programs of the present invention are stored in the system memory and/or non-volatile memory of the respective computer, or in a memory of another computer, and executed by the CPU. The CPU executing code and data from the memory thus comprises a means for configuring and controlling one or more USB DAQ devices 110 to acquire/generate data from/to the field signals according to the steps described below. The computer 102 preferably also includes an installation media, e.g., floppy disk(s) 110, or a CD-ROM, on which the computer programs according to the present invention are stored for loading into the computer system.

In the present disclosure, the terms "memory" or "memory media" are intended to include various types of memory, including installation media such as a CD-ROM, floppy disks 110, or tape drive disks, computer system memory such as DRAM, SRAM, SDRAM, EDO RAM etc., and non-volatile memory such as a hard drive or optical storage. It is also noted that the memory may be located in the computer which executes the program or may be located in a different computer, as desired.

Figure 2:
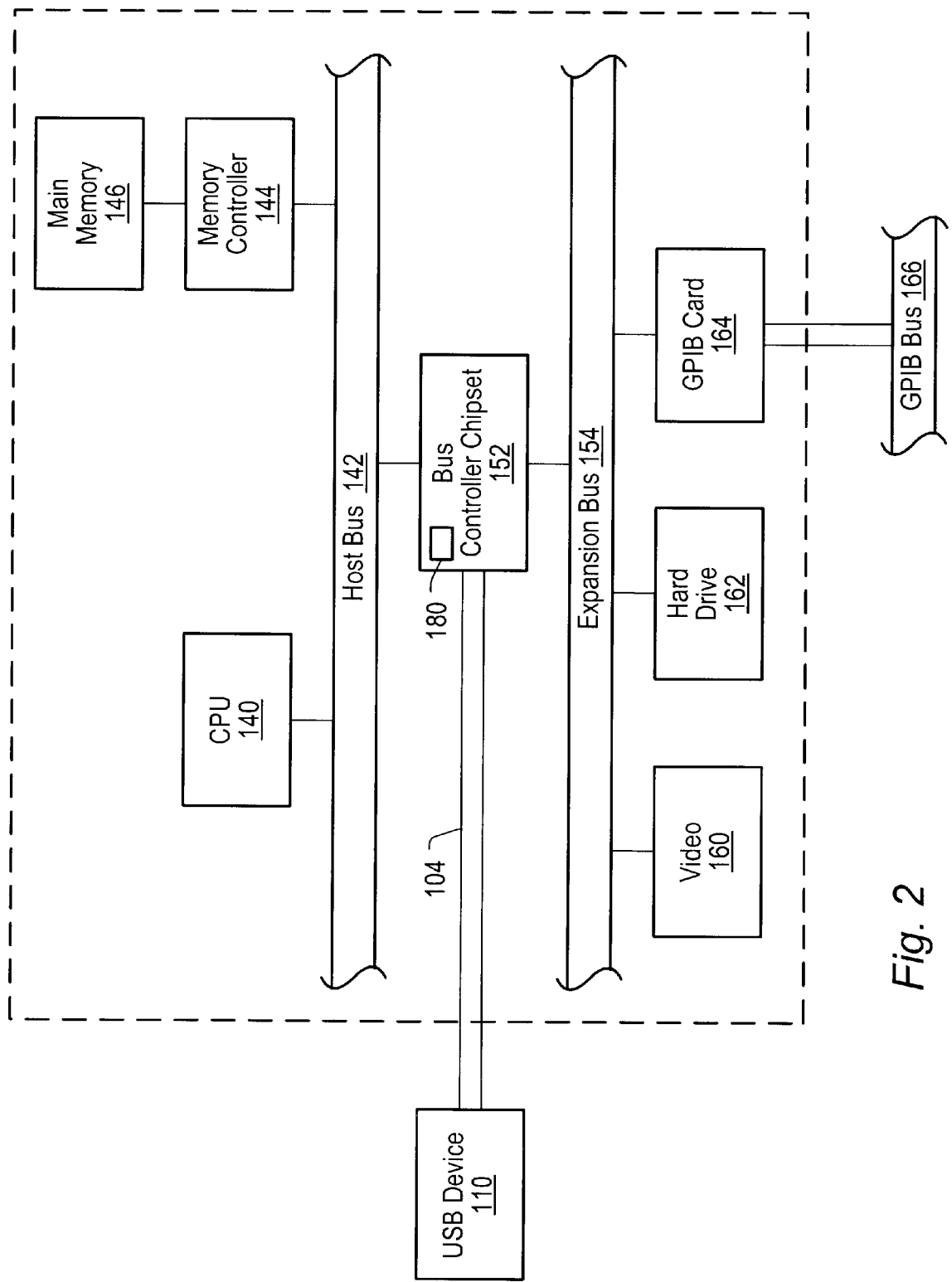
FIG. 2 is a block diagram of the computer system of FIG. 1.

FIG. 2—Computer Block Diagram

FIG. 2 illustrates a representative block diagram of the computer system 102. It is noted that the computer system 102 may have various different architectures, as desired. The elements of a computer system not necessary to understand the operation of the present invention have been omitted for simplicity.

The computer system 102 includes a central processing unit or CPU 140 which is coupled to a processor or host bus 142. The CPU 140 may be any of various types, including an Intel x86 processor such as the Pentium class from Intel, a PowerPC CPU from the Motorola family of processors, as well as others.

Main memory 146, also referred to as system memory 146, is coupled to the host bus 142 by means of memory controller 144. The system memory 146 stores various software used in the USB DAQ system 70, including a DAQ application, DAQ driver level software, and USB driver software according to the present invention. The DAQ driver level software is preferably NI-DAQ from National Instruments.

The system memory 146 also stores virtual buffer software according to the present invention. The virtual buffer software implements the virtual FIFO features of the present invention. In the preferred embodiment, the virtual buffer software is comprised in the USB driver software. However, it is noted that the virtual FIFO features of the present invention may be implemented in any of various software programs, as desired. The system memory 146 may store other software or other DAQ related software, as desired.

Host bus 142 is coupled to an expansion or input/output bus 154 by means of a bus controller 152, also referred to as chipset logic 152. The chipset logic 152 is preferably the Triton chipset or other similar chipset logic available for computer systems which implement USB. The chipset logic 152 includes USB interface logic 180 which couples to one or more USB ports. The USB ports are for coupling to USB cable 104 and hence for interfacing to the USB I/O device 110. It is noted that the USB interface logic 180 may be comprised in various different parts of the computer system, as desired.

The expansion bus 154 is preferably the PCI (Peripheral Component Interconnect) bus. The expansion bus 154 includes slots for various devices, including video 160.

A non-volatile memory or hard drive 162 is comprised in the computer system 102 and may be coupled to the expansion bus 154 or to the chipset 152, or to other logic. The non-volatile memory 162 stores an operating system, DAQ software, as well as other application programs, for loading into the system memory 146 as known in the art. Various other devices may be connected to the expansion bus 154, as desired.

Figure 3:
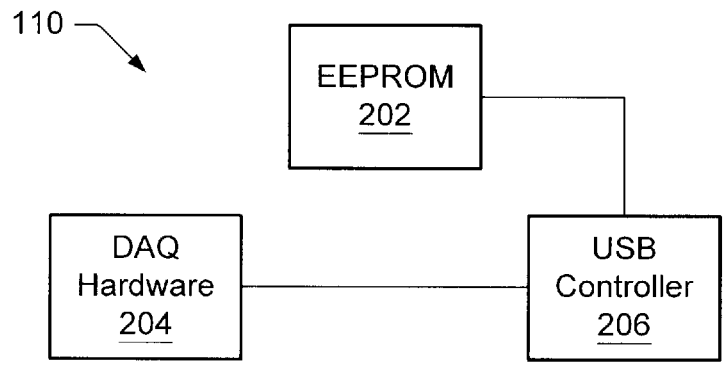
FIG. 3 is a block diagram of the USB-based DAQ device of FIG. 1.

FIG. 3–USB I/O Device

FIG. 3 is a block diagram of the USB-based DAQ device 110. As shown, the USB DAQ device 110 includes DAQ hardware 204, a USB controller 206 and an EEPROM (Electrically Erasable Programmable Read Only Memory) 202. The DAQ hardware 204 comprises the data acquisition hardware circuitry which performs data acquisition/generation functions, as is well known in the art. The USB controller 206 performs USB interface functions. The EEPROM stores instructions and data for performing USB activities, such as reading a byte or word from the control pipe.

FIG. 4

Figure 4:
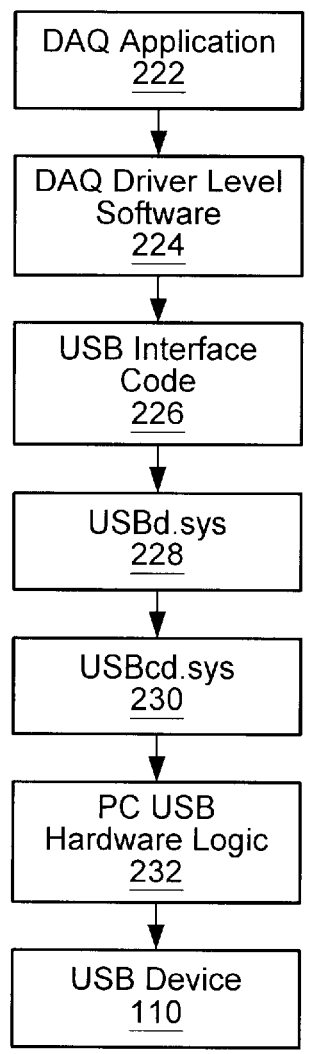
FIG. 4 illustrates the software components comprised in the computer system of FIG. 1.

FIG. 4 illustrates the software components comprised in the computer system 102 according to the preferred embodiment. As shown, the computer system includes a data acquisition application 222, DAQ driver level software 224, also referred to as device driver software, USB interface code 226, also referred to as serial bus driver software, a USBd.sys program 228, and a USBcd.sys program 230. These software components 222–230 operate to interface through the PC USB hardware logic 232 to communicate with the USB device 110.

The DAQ application 222 comprises an application which performs a data acquisition function, such as requiring or generating data to perform a desired test and measurement operation or other type of operation. The DAQ application 222 includes calls to the DAQ driver level software 224. The DAQ application 222 may be a LabVIEW program, or a textual program written in, for example, C or C++.

As mentioned above, in the preferred embodiment the DAQ driver level software 224 is the NI-DAQ software program from National Instruments Corporation. The DAQ driver level software 224 includes various functions or operations which operate to control a data acquisition device. In the preferred embodiment where the DAQ device is a USB DAQ device 110, the DAQ driver level software 224 interfaces to USB interface code 226. The DAQ driver level software 224 is referred to generally as device driver software.

The USB interface code 226 performs the functions of interfacing to the universal serial bus or USB in response to functions being performed by the DAQ driver level software 224. In the preferred embodiment of the invention, the USB interface code 226 is designed to minimize the impact on the DAQ driver level software 224. In other words, the USB interface code 226 is preferably designed so that the fact that the DAQ device is a USB DAQ device 110 is substantially transparent or invisible to the DAQ driver level software 224.

In the preferred embodiment, the USB interface code 226 includes the virtual buffer software of the present invention. As described below, the virtual buffer software operates to receive or intercept calls made by the DAQ driver level software 224 to acquire data from the device, wherein the DAQ driver level software 224 is possibly designed to read the data from the device one sample at a time from the device. The virtual buffer software intercepts the call and requests the data in bulk packets from the device. The virtual buffer software then stores the received packets of data in a virtual buffer or virtual FIFO maintained in computer system memory. The DAQ driver level software 224 then obtains the data from the computer system memory using much faster transfers. The virtual buffer software emulates operation of the device, including generation of interrupts and responses to status register reads, thus "fooling" the DAQ driver level software 224 into thinking the data is being acquired from the device. Thus, the present invention allows for much faster data transfers, without requiring changes to the existing DAQ driver level software 224.

The virtual buffer software implements a virtual first in first out (FIFO) buffer in the computer system memory which emulates the hardware USB DAQ device 110. The virtual buffer software creates software interrupts which emulate hardware interrupts and operates transparently with simultaneous operations to other portions of the hardware device 110. The virtual buffer software of the present invention operates to increase USB performance, i.e., the performance of USB data transfers to/from the USB device 110, while also minimizing impact on the DAQ driver level software code 224, also referred to as the "board code driver".

The USB interface code 226 interfaces to the USBd.sys program 228 and to a USBcd.sys program 230. As is well known, the USBd.sys and the USBcd.sys programs 228 and 230 comprise standard USB drivers which are available from Microsoft Corporation. The USB interface code 226 interfaces to the programs 228 and 230 to control the USB hardware logic 232 comprised in the computer system 102. The PC USB hardware logic 232 then interfaces to the USB device 110, including generating and receiving data transfers to/from the USB device 110.

Figure 5:
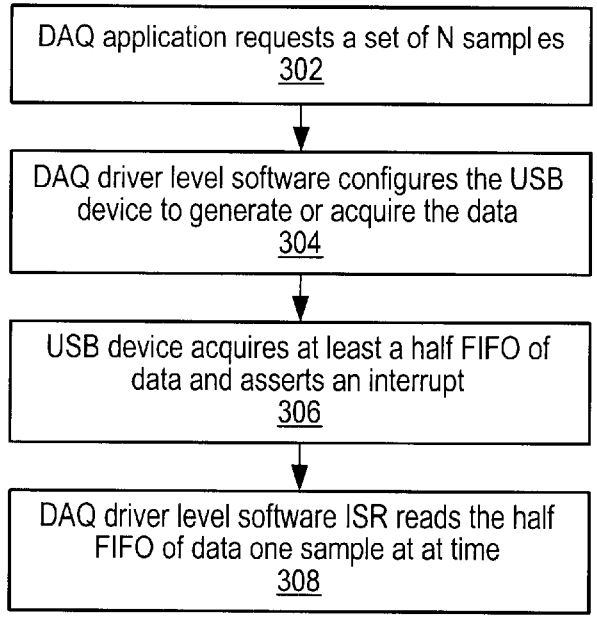
FIG. 5 is a flowchart diagram illustrating a prior art method for acquiring data using the USB-based DAQ device.

FIG. 5—Prior Art Operation

FIG. 5 is a flowchart diagram illustrating operation of DAQ driver level software interfacing to a USB device according to the prior art. As shown, in step 302 the DAQ application or user application requests a set of samples, e.g., N samples or 100,000 samples. In step 304 the DAQ driver level software configures the USB device to generate or acquire the data. In step 306 the USB device asserts an interrupt after acquiring at least a half FIFO of data. In step 308, in response to the interrupt asserted in step 306, the DAQ driver level software interrupt service routine executes to read the half FIFO of data from the USB device, across the USB, one sample at a time. Due to the relatively slow speed of the USB, as well as the fact that the DAQ device reads one sample at a time, the data transfers are relatively slow. For example, the time required to read 100,000 samples from the USB device would be no faster than 100,000 samples times 0.003 seconds/sample which equals 300 seconds, i.e., 333 samples per second. Thus, using the prior art method, simple data acquisition tasks take a very large amount of time.

Figure 6A:
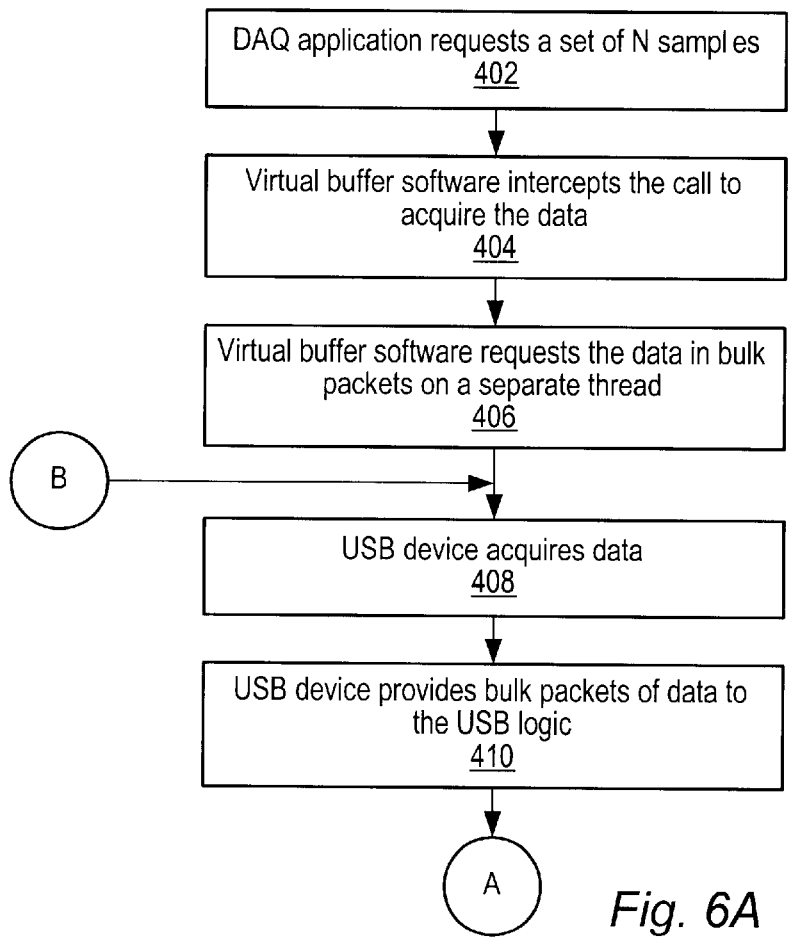
FIGS. 6A and 6B are a flowchart diagram illustrating a method of the present invention for acquiring data using the USB-based DAQ device according to the present invention.
Figure 6B:
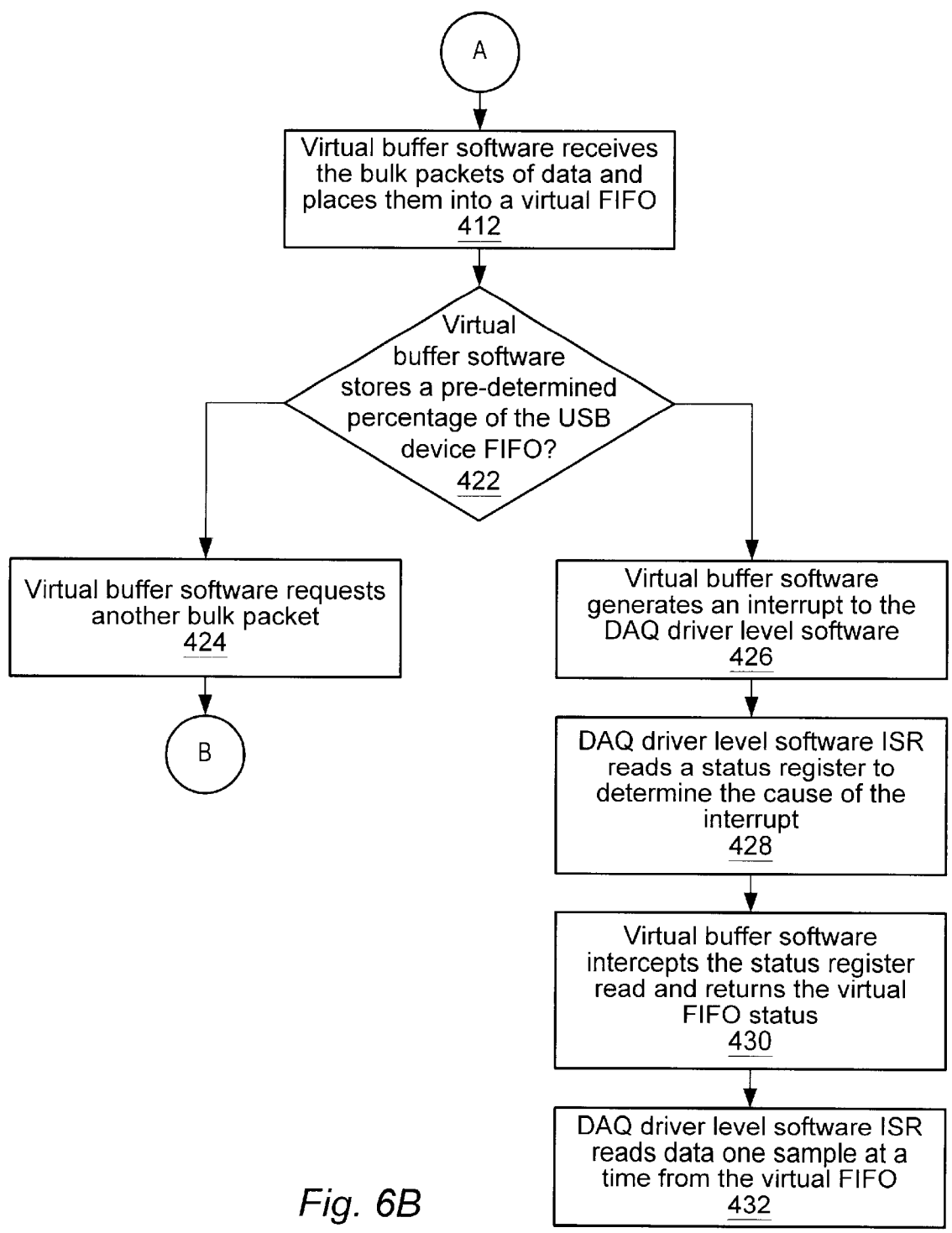

FIGS. 6A and 6B—Flowchart Diagram of Virtual Buffer Operation of the Present Invention FIGS. 6A and 6B are a flowchart diagram illustrating operation of the virtual buffer software of the present invention. According to the present invention, the virtual buffer software allows speeds of 100 K samples/second without requiring any changes to the device driver software, e.g., the DAQ driver level software.

As noted above, the present invention may be used in any of various types of fields which include data acquisition/generation, including instrumentation, audio, video, printer devices, and other types of I/O device or peripheral data acquisition. The flowcharts of FIGS. 6A and 6B presume a data acquisition example.

As shown, operation of the preferred embodiment of the virtual buffer software of the present invention is generally as follows. First, in step 402, the DAQ application requests data, e.g., the DAQ application requests a set of N samples. In step 402 the DAQ application preferably makes a call to the DAQ driver level software. In response, the DAQ driver level software 224 preferably makes a call to the virtual buffer software.

In step 404 the virtual buffer software receives or intercepts the call to acquire data. In the preferred embodiment, the virtual buffer software receives or intercepts the call made by the DAQ driver level software 224. In one embodiment, the virtual buffer software intercepts a DAQ driver level software call to the USB DAQ device.

In step 406 the virtual buffer software requests the data from the USB device 110 in bulk packets, preferably on a separate thread or process. Thus, whereas the DAQ driver level software 224 is designed to perform reads a sample at a time, the virtual buffer software operates to request the data from the USB device 110 in bulk packets, thus allowing much faster transfers.

In step 408, in response to the request from the virtual buffer software, the USB device acquires the data from the respective unit under test or system/process. In step 410 the USB device 110 provides bulk packets of data to the USB logic 232.

When the virtual buffer software receives the bulk packets from the USB device 110, in step 412 the virtual buffer software places the data into a virtual buffer or virtual FIFO which is implemented in the system memory. In other words, the virtual buffer software places the data into a buffer portion of system memory.

As shown, in step 422 the virtual buffer software preferably determines whether it has stored a predetermined percentage of the USB device FIFO, i.e., whether the virtual buffer software has stored data received from the USB device 110 corresponding to at least a predetermined percentage of the FIFO buffer in the USB device. If the virtual buffer software has not stored a predetermined percentage as determined in step 422, then in step 424 the virtual buffer software requests another bulk packet from the USB device 110. Thus, when the virtual buffer software receives a bulk packet of data from the USB device 110, the virtual buffer software places the data into the virtual FIFO and preferably requests another bulk packet in stop 424 from the device 110 until a percentage or all of the data is received.

In the preferred embodiment, once the virtual FIFO has stored at least a predetermined percentage of the USB device's FIFO size, e.g., has stored at least a half of the device size FIFO, then in step 426 the USB driver 226 generates an interrupt to the DAQ driver level software.

In the preferred embodiment, the virtual buffer software requests bulk packets from the device 110 until at least a predetermined percentage of the USB device FIFO has been received. For example, in one embodiment the USB device 110 device is designed to generate an interrupt when a first amount of data has been acquired, e.g., when half of the device FIFO has been filled. In this embodiment, the virtual buffer software generates the interrupt to the device driver software when at least the first amount of data is stored in the buffer portion of the computer memory, e.g., when data comprising at least half of the device sized FIFO has been received. However, it is noted that the virtual FIFO may generate an interrupt when any of various types or percentages of the device FIFO or any amount of data has been received. It is also noted that the virtual FIFO is preferably much larger than the device sized FIFO.

In response to the interrupt generated by the virtual buffer software in step 426, in step 428 a DAQ driver level software interrupt service routine (ISR) reads a status register to determine the cause of the interrupt.

In step 430 the virtual buffer software intercepts the status register read operation initiated in step 428 and operates to return the status of the virtual FIFO. Thus, in response to the read generated by the DAQ driver level software ISR, which is attempting to read the appropriate status register, the DAQ driver level software ISR actually receives the status of the virtual FIFO instead. The status register of the virtual FIFO reflects the FIFO half full assertion interrupt previously generated in step 426.

In step 432, in response to receiving the virtual FIFO status in step 430, the DAQ driver level software ISR routine operates to read the data stored in the virtual FIFO one sample at a time. Once the DAQ driver level software ISR has read the half FIFO of data from the virtual FIFO, the ISR routine completes.

Thus, according to the present invention, the DAQ driver level software operates to read data one sample at a time from the virtual FIFO implemented in the system memory 146. This read occurs much faster than a read operation of data from the USB device 110 across the USB cable 104. Instead, according to the present invention, data is actually provided by the USB device 110 to the computer system in bulk packets, which is much faster than reading or transferring the data a single sample at a time. Once the data has been stored in the virtual FIFO in system memory 146, the data is obtained much more quickly from the system memory 146.

The virtual buffer software operates to emulate operation of the device, including generation of interrupts and intercepting and returning read requests for status registers. As a result, the DAQ driver level software is essentially "fooled" into believing that it is actually acquiring data one sample at a time from the USB device 110. The virtual buffer software thus operates without substantial modification to the DAQ driver level software. Steps 402–432 preferably are repeated one or more times until operations are completed. In the DAQ example of the preferred embodiment, steps 402–432 are repeated until an end of DAQ is received, which indicates that the USB device 110 has stopped generating or providing data.

Figure 7:
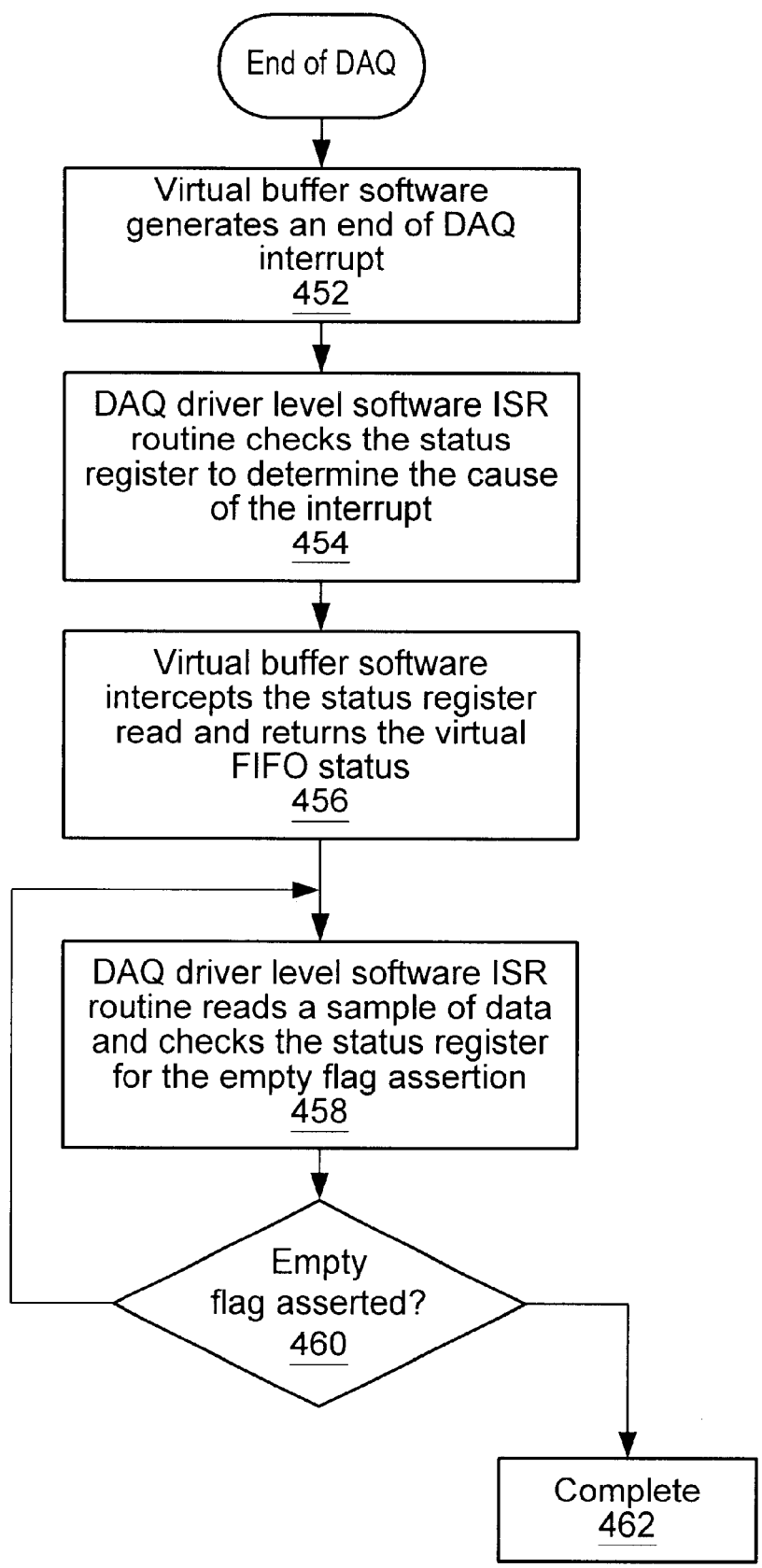
FIG. 7 is a flowchart diagram illustrating operation when a hardware interrupt occurs during the flowchart of FIGS. 6A and 6B.

FIG. 7—End of DAQ Operations

FIG. 7 is a flowchart diagram illustrating operation when data acquisition/generation operations are completed, i.e., steps 402—432 have been executed one or more time to acquire or generate a plurality of data samples. As shown, in step 452 the virtual buffer software generates an end of DAQ interrupt indicating that the data acquisition operation has completed. The end of DAQ interrupt is generated when the buffer portion of the computer memory, the virtual FIFO, stores less than the first amount of data, e.g., less than a percentage of the USB device's FIFO, and the USB device 110 is not providing data to the computer system In response to the end of DAQ interrupt, in step 454 the DAQ driver level software ISR routine checks the appropriate status register to determine the cause of the interrupt. In step 456 the virtual buffer software intercepts the status register read operation and operates to return the status of the virtual FIFO. In this case, the virtual FIFO status register will reflect the end of DAQ assertion which was asserted in step 452.

In steps 458 and 460 the DAQ driver level software ISR routine reads the remaining samples of data from the virtual FIFO until the virtual FIFO is empty. In step 458 the DAQ driver level software ISR routine reads a sample of data from the virtual FIFO and checks the status register for the empty flag assertion. As shown, the DAQ driver level software ISR routine operates to continuously read a sample of data and check the status register for the empty flag assertion one or more times until the empty flag is asserted. When the empty flag is determined to be asserted in step 460, then operation completes as shown in step 462. Thus, in step 458 the DAQ driver level software ISR routine reads a sample of data at a time from the virtual FIFO until the virtual FIFO is empty, as signified by the empty flag assertion.

DAQ Driver Level Software Requirements

The DAQ driver level software or board code has several requirements in the preferred embodiment.

First, the board code is required to run seamlessly to the end-user; therefore, the end user should be able to acquire the data without change to the application software, no matter on what bus the device is located.

The board code is also required to handle all of the FIFO related interrupts, e.g., overflow.

Further, the board code preferably runs concurrently with true hardware generated interrupts, i.e., other interrupt conditions that are generated using the same status register.

Further, the board code preferably intercepts hardware generated interrupt conditions that coincide with the virtual FIFO. For example, the board code preferably does not receive a hardware interrupt based on the device's half full FIFO condition. Rather the board code receives the interrupt based on the virtual FIFO emulating the half full FIFO condition.

Finally, the virtual buffer software, i.e., the virtual FIFO implementation, preferably masks any flags modified in the status register in addition to intercepting hardware generated interrupts.

Example Operation

The USB DAQ device 110 may have several status registers (e.g., the National Instruments DaqPAD-6020E), and the USB DAQ device 110 may perform simultaneous multiple data acquisition (e.g., analog input from the FIFO and analog output). In the preferred embodiment, the virtual buffer software creates a software generated interrupt for the half-full FIFO condition. Therefore, the virtual buffer software operates to intercept the DAQ driver level software ISR's request to read the device at the particular register and instead provides the virtual FIFO's flag values.

In a more complicated example, the USB DAQ device 110 may have several status registers (e.g., the DaqPAD-6020E), and the device may perform simultaneous multiple data acquisition (e.g., analog input from the FIFO and analog output). Here assume that the analog output generates an interrupt. The DAQ driver level software ISR routine will read in all status registers. It is noted that virtual buffer software only modifies a few flags within a status register, and the DAQ driver level software ISR routine may need to examine the other flags on that register. Therefore, when the ISR routine reads in the related status register, the virtual buffer software operates to intercept the status register read and mask in the virtual FIFO's flag values, leaving the other status register values unchanged. It is noted that the device does not have knowledge of the virtual FIFO and believes the status register values reflect the true state of the hardware.

In the preferred embodiment, existing application programs and I/O drivers require no modifications to use the present invention. In other words, the virtual FIFO techniques are transparent to the application program and I/O drivers. According to the present invention, Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing data transfers in a system comprising a computer system and a device coupled to the computer system through a serial bus, wherein the computer system includes device driver software and serial bus driver software, wherein the computer system also includes virtual buffer software, the method comprising;

a) an application executing in the computer system making a call to the device driver software requesting data from the device, wherein the device driver software is designed to read the data one sample at a time from the device;

b) the virtual buffer software receiving a call from the device driver software requesting data from the device;

c) the virtual buffer software requesting data from the device in one or more packets after said intercepting;

d) the computer system receiving the packets of data from the device;

e) the virtual buffer software storing the data into a buffer portion of a computer memory in the computer system in response to receiving the packets of data;

f) the virtual buffer software generating an interrupt to the device driver software indicating that an amount of data is stored in the buffer portion of the computer memory;

g) a device driver software interrupt service routine executing to read a status register to determine a cause of the interrupt in response to the interrupt;

h) the virtual buffer software intercepting the status register read operation and returning a status of the buffer portion of the computer memory which stores the data, wherein the status of the buffer portion of the computer memory reflects the data received from the device;

i) the device driver software interrupt service routine reading the data a sample at a time from the buffer portion of the computer memory in response to the interrupt and in response to the status of the buffer portion of the computer memory reflecting the data received from the device.

2. The method of claim 1, wherein the virtual buffer software is comprised in the serial bus driver software.

3. The method of claim 1, wherein the virtual buffer software generating the interrupt to the device driver software indicating that the amount of data is stored in the buffer portion of the computer memory operates to emulate an interrupt generated by the device.

4. The method of claim 1, wherein the serial bus is the Universal Serial Bus (USB), wherein the device is a USB device.

5. The method of claim 1, wherein the device is designed to generate an interrupt when a first amount of data has been acquired;

wherein the virtual buffer software generates the interrupt to the device driver software when at least the first amount of data is stored in the buffer portion of the computer memory.

6. The method of claim 1, further comprising:

repeating said (a)–(i) a plurality of times until the buffer portion of the computer memory stores less than the amount of data and the device is not providing data to the computer system;

the virtual buffer generating an end of acquisition interrupt to the device driver software indicating the end of the data acquisition;

a device driver software interrupt service routine executing to read a status register to determine a cause of the interrupt in response to the interrupt;

the virtual buffer intercepting the status register read operation and returning a status of the buffer portion of the memory which stores the data, wherein the status of the buffer portion of the computer memory reflects assertion of the end of acquisition interrupt;

the device driver software interrupt service routine reading the data a sample at a time from the buffer portion of the computer memory in response to the end of acquisition interrupt and in response to the status of the buffer portion of the computer memory reflects assertion of the end of acquisition interrupt until all data is read.

7. The method of claim 1, wherein the virtual buffer software operates to emulate operation of the device.

8. The method of claim 1, wherein the virtual buffer software operates without substantial modification to the device driver software.

9. The method of claim 1, wherein the device is a data acquisition device, wherein the device driver software comprises data acquisition driver software.

10. A method for performing data transfers in a system comprising a computer system and a device coupled to the computer system through a serial bus, wherein the computer system includes device driver software, the method comprising;

an application executing in the computer system making a call to the device driver software requesting data from the device, wherein the device driver software is designed to read the data one sample at a time from the device;

receiving a call from the device driver software requesting data from the device;

requesting data from the device in one or more packets after said receiving;

the computer system receiving the packets of data from the device;

storing the data into a buffer portion of a computer memory in the computer system in response to receiving the packets of data;

generating an interrupt to the device driver software indicating that an amount of data is stored in the buffer portion of the computer memory;

a device driver software interrupt service routine reading the data a sample at a time from the buffer portion of the computer memory in response to the interrupt.

11. The method of claim 10, further comprising:

the device driver software interrupt service routine executing to read a status register to determine a cause of the interrupt after said generating the interrupt and prior to the device driver software interrupt service routine reading the data a sample at a time from the buffer portion of the computer system memory;

intercepting the status register read operation and returning a status of the buffer portion of the computer memory which stores the data, wherein the status of the buffer portion of the computer memory reflects the data received from the device;

wherein the device driver software interrupt service routine reads the data a sample at a time from the buffer portion of the computer memory in response to said returning the status of the buffer portion of the computer memory.

12. The method of claim 10, wherein the computer system also includes virtual buffer software, wherein the virtual buffer software performs said intercepting the call, said requesting data from the device in one or more packets, said storing the data into the buffer portion of the computer memory, and said generating the interrupt to the device driver software.

13. A data acquisition (DAQ) system, comprising:

a computer system, wherein the computer system includes memory which stores data, wherein the computer system includes DAQ device driver software, and wherein the computer system also includes virtual buffer software;

a serial bus coupled to the computer system; and a data acquisition (DAQ) device coupled to the computer system through the serial bus;

wherein the computer system includes an application which is executable to make a call to the DAQ device driver software requesting data from the DAQ device, wherein the DAQ device driver software is designed to read the data one sample at a time from the DAQ device;

wherein the virtual buffer software is executable to receive a call from the DAQ device driver software requesting data from the DAQ device and request data from the DAQ device in one or more packets;

wherein the virtual buffer software is executable to store received packets of data into a buffer portion of the computer memory in the computer system and generate an interrupt to the DAQ device driver software indicating that an amount of data is stored in the buffer portion of the computer memory;

wherein the computer system further includes a DAQ device driver software interrupt service routine which is executable to read the data a sample at a time from the buffer portion of the computer memory in response to the interrupt.

14. The DAQ system of claim 13, wherein the DAQ device driver software interrupt service routine executes in response to the interrupt to read a status register to determine a cause of the interrupt in response to the interrupt;

wherein the virtual buffer software is executable to intercept the status register read operation and return a status of the buffer portion of the computer memory which stores the data, wherein the status of the buffer portion of the computer memory reflects the data received from the DAQ device;

wherein the DAQ device driver software interrupt service routine is executable to read the data a sample at a time from the buffer portion of the computer memory in response to the interrupt and also in response to the status of the buffer portion of the computer memory reflecting the data received from the DAQ device.

15. The DAQ system of claim 13, wherein the serial bus is the Universal Serial Bus (USB).

16. The DAQ system of claim 13, wherein the virtual buffer software operates to emulate operation of the DAQ device.

17. The DAQ system of claim 13, wherein the virtual buffer software operates without modification to the DAQ device driver software.

18. A memory media which comprises program instructions for performing data transfers in a system comprising a computer system and a device coupled to the computer system through a serial bus, wherein the computer system includes device driver software, wherein the computer system also includes virtual buffer software, wherein an application comprised in the computer system is executable to make a call to the device driver software requesting data from the device, wherein the device driver software is designed to read the data one sample at a time from the device;

wherein, in response to the application making the call to the device driver software requesting data from the device, the program instructions implement:
receiving a call from the device driver software requesting data from the device;
requesting data from the device in one or more packets after said intercepting;
receiving the packets of data from the device;
storing the data into a buffer portion of a computer memory in the computer system in response to receiving the packets of data; and
generating an interrupt to the device driver software indicating that an amount of data is stored in the buffer portion of the computer memory;

wherein a device driver software interrupt service routine comprised in the device driver software is executable to read the data a sample at a time from the buffer portion of the computer memory in response to the interrupt.

19. The memory media of claim 18, wherein the device driver software interrupt service routine is executable to read a status register to determine a cause of the interrupt;

wherein the program instructions further implement:
intercepting the status register read operation and returning a status of the buffer portion of the computer memory which stores the data, wherein the status of the buffer portion of the computer memory reflects the data received from the device;

wherein the device driver software interrupt service routine is executable to read the data a sample at a time from the buffer portion of the computer memory in response to said returning the status of the buffer portion of the computer memory.

* * * * *